Patented Jan. 9, 1951

2,537,880

UNITED STATES PATENT OFFICE 2,537,880

PROCESS FOR PREPARING POLYMETHINE DYES

Samuel G. Dent, Jr., and Leslie G. S. Brooker, Rochester, N. Y., assignors to Eastman Kodak Company, Rochester, N. Y., a corporation of New Jersey No Drawing. Application January 13, 1949, Serial No. 70,796

17 Claims. (Cl. 260—240.1)

This invention relates to a process for preparing polymethine dyes and to new dyes obtainable thereby.

It is well known that carbocyanine dyes (trimethinecyanine dyes) can be prepared by condensing a cyclammonium quaternary salt containing a methyl group, with an alkyl orthoformate, in the presence of pyridine or in the presence of acetic anhydride. However, this method fails entirely with 1-methylisoquinoline alkiodides and with α-picoline alkiodides.

We have now found that carbocyanine dyes can be prepared by condensing a cyclammonium quaternary salt containing a methyl group, with a dialkoxymethyl carboxylate (e. g. diethoxymethyl acetate). In some cases, neocyanine is formed concomitantly with the carbocyanine and we have found that with certain solvents (reaction media) the process, in certain cases, can be controlled to give only carbocyanine dye, while in certain other cases the process can be controlled to give only neocyanine dye.

It is, accordingly, an object of our invention to provide a new process for preparing polymethine dyes. A further object is to provide new polymethine dyes. Other objects will become apparent hereinafter.

In accordance with our invention, we condense a cyclammonium quaternary salt containing a methyl group in a reactive position (i. e. the α- or γ-position) with a dialkoxymethyl carboxylate. The cyclammonium quaternary salts which are advantageously employed in practicing our invention can be represented by the following general formula:

I.

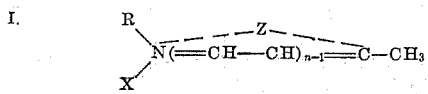

wherein $n$ represents a positive integer of from 1 to 2, R represents an alkyl group (i. e. an alcohol radical), e. g. methyl, ethyl, n-propyl, isobutyl, n-butyl, n-amyl, isoamyl (e. g. an alkyl group of the formula $C_mH_{2m+1}$ wherein $m$ represents a positive integer from 1 to 5), β-hydroxyethyl, γ-hydroxypropyl, β-methoxyethyl, β-ethoxyethyl, allyl, β-methallyl, benzyl (phenylmethyl), β-phenylethyl, β-carboxyethyl, carboxymethyl, α-carboxyethyl, γ-carboxypropyl, β-acetoxyethyl, γ-acetoxypropyl, carbomethoxymethyl, β-carbomethoxyethyl, carbethoxymethyl, β-carbethoxyethyl, β-sulfoethyl, phenylmercaptomethyl, phenoxymethyl, β-phenylmercaptoethyl, β-phenoxyethyl, etc., X represents an anion, e. g. chloride, bromide, iodide, thiocyanate, sulfamate, methylsulfate, ethylsulfate, perchlorate, benzenesulfonate, p-toluenesulfonate, xylenesulfonate, etc. and Z represents the non-metallic atoms necessary to complete a heterocyclic nucleus selected from the group consisting of those of the thiazole series (e. g. thiazole, 4-methylthiazole, 5-methylthiazole, 4-phenylthiazole, 5-phenylthiazole, 4,5-dimethylthiazole, 4,5-diphenylthiazole, 4-(2-thienyl)thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g. α-naphthothiazole, β-naphthothiazole, 5-methoxy-β-naphthothiazole, 5-ethoxy-β-naphthothiazole, 7-methoxy-α-naphthothiazole, 8-methoxy-α-naphthothiazole, etc.), those of the thionaphtheno-7', 6'', 4, 5-thiazole series (e. g. 4'-methoxythionaphtheno-7', 6', 4, 5-thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g. benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e. g. α-naphthoxazole, β-naphthoxazole, etc.), those of the selenazole series (e. g. 4-methylselenazole, 4-phenylselenazole, etc.), those of the benzoselenazole series (e. g. benzoselenazole, 5-chlorobenzoselenazole, 5-methoxybenzoselenazole, 5-hydroxybenzoselenazole, tetrahydrobenzoselenazole, etc.), those of the naphthoselenazole series (e. g. α-naphthoselenazole, β-naphthoselenazole, etc.), those of the thiazoline series (e. g. thiazoline, 4-methylthiazoline, etc.), those of the 2-quinoline series (e. g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g. quinoline, 6-methoxyquinoline, 7-methylquinoline, 8-methylquinoline, etc.), those of the 1-isoquinoline series (e. g. isoquinoline, 3,4-dihydroisoquinoline, etc.), those of the 3-isoquinoline series (e. g. isoquinoline, etc.), those of the 3,3-dialkylindolenine series (e. g. 3,3-dimethylindolenine, 3,3,5-trimethylindolenine, 3,3,7-trimethylindolenine, etc.), those of the 2-pyridine series (e. g. pyridine, 3-methylpyridine, 4-methylpyridine, 5-methylpyridine, 6-methylpyridine, 3,4-dimethylpyridine, 3,5-dimethylpyridine, 3,6 - dimethylpyridine, 4,5 - dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e. g. 2-methylpyridine, 3-methylpyridine, 2-chloropyridine, 3-chloropyridine, 2,3-dimethylpyridine, 2,5-dimethylpyridine, 2,6-dimethylpyridine, 2-hydroxypyridine, 3-hydroxypyridine, etc.), etc. In addition, R can represent an aryl group, e. g. phenyl, p-chlorophenyl, etc. when Z represents the non-metallic atoms necessary to complete a heterocyclic nucleus of the thiazole, thiazoline, benzothiazole or 3,3-dialkylindolenine series. Those cyclammonium quaternary salts represented by Formula I wherein R represents a primary alkyl group containing from 1 to 5 carbon atoms, e. g. methyl, ethyl, n-propyl, isobutyl, n-butyl, n-amyl, isoamyl, β-hydroxyethyl, γ-hydroxypropyl, β-methoxyethyl, β-ethoxyethyl, allyl, β-methallyl, β-carboxyethyl, carboxymethyl, β-carbethoxyethyl, carbethoxymethyl, etc., are especially useful in practicing our invention.

The dialkoxymethyl carboxylates advantageously employed in practicing our invention can be represented by the following general formula:

II. 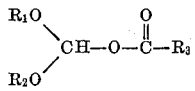

wherein $R_1$, $R_2$, and $R_3$ each represents an alkyl group, e. g. methyl, ethyl, n-propyl, isobutyl, n-butyl, etc. (e. g. an alkyl group of the formula $C_nH_{2n+1}$ wherein $n$ represents a positive integer from 1 to 4). The esters represented by Formula II can advantageously be prepared by reacting an ortho ester (e. g. triethyl orthoformate, etc.) with an organic carboxylic acid anhydride (e. g. acetic anhydride, etc.). Such a method is described by H. W. Post in "Jour. Organ. Chem.," vol. 2 (1937), pages 260–266. Diethoxymethyl acetate has been found to be especially useful in practicing our invention, although other esters, e. g. diethoxymethyl propionate, etc. can be used.

The condensations of our invention can be carried out in the presence or absence of a solvent or diluent. As solvents or diluents, we can use the tertiary amines (e. g. triethylamine, tri-n-butylamine, pyridine, etc.), carboxylic acid anhydrides (e. g. acetic anhydride, etc.), cyclic ethers (e. g. 1,4-dioxane, etc.), piperidine, acetic acid, formamide, nitromethane, nitrobenzene, cresols, etc. As has already been shown, in some cases, neocyanines are formed concomitantly with the carbocyanine, while with certain solvents, in certain cases, the process can be controlled to give only carbocyanine dyes, while in certain other cases the process can be controlled to give only neocyanine dyes. The effect of some of the solvents (reaction media) which can be employed in our invention are summarized in the table below. The effect observed when no solvent is used is also shown.

The condensations are accelerated by heat, and generally, it is advantageous to subject the reactants to temperatures above room temperature.

The following examples will illustrate more fully the manner whereby we practice the process of our invention.

*Example 1.—1,1' - dimethyl-2,2' - pyridocarbocyanine iodide*

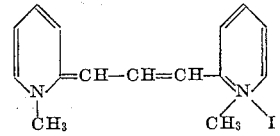

A mixture of 4.70 g. (2 mol.) of α-picoline methiodide and 1.62 g. (1 mol.) of diethoxymethylacetate in 10 cc. of piperidine, was heated at 120° C. in an oil bath for 3 hours. After chilling the mixture, the solids were collected on a filter, washed with acetone and water, and dried. The yield of dye was 14% crude and 9% after recrystallization from ethyl alcohol (200 cc./g. of dye). The dye melted at about 260° C. Its solution in methyl alcohol gave an absorption maximum at 556 mu.

*Example 2.—1,1'-dimethyl-9-(2-pyridyl methiodide)-2,2'-pyridodicarbocyanine iodide*

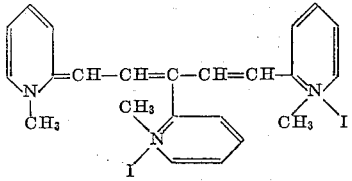

A solution of 3.50 g. (3 mol.) of α-picoline methiodide and 2.40 g. (2 mol. + 50% excess) of diethoxymethyl acetate in 20 cc. of pyridine, was refluxed gently for 2 hours, and then was chilled. The solid which separated was filtered off, stirred with a little hot ethyl alcohol, and chilled. The yield of crude dye was 20% and 8% after two recrystallizations from methyl alcohol (150 cc./g. of dye). The glistening green crystals melted at about 236° C. and a solution of the dye in methyl alcohol had an absorption maximum at 597 mu.

*Example 3.—1,1' - diethyl - 9 - (2-pyridyl ethiodide)-2,2'-pyridodicarbocyanine iodide*

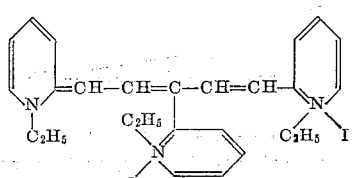

A solution of 5 g. (3 mol.) of α-picoline ethiodide and 3.2 g. (2 mol. + 50% excess) of diethoxymethyl acetate in 25 cc. of pyridine, was refluxed gently for 2 hours. The dye was precipitated out of the reaction mixture by chilling the solution, diluted with 3 volumes of diethyl ether, in a solid carbon dioxideacetone bath. The precipitated dye was collected on a filter, stirred with hot ethyl alcohol, chilled and again filtered. The yield of dye after three additional recrystallizations from ethyl alcohol (40 cc./g. of dye) was 17%. The dye melted at about 230° C. and had an absorption maximum in methyl alcohol at 596 mu.

*Example 4.—1,1'-dimethyl-4,4'-pyridocarbocyanine iodide*

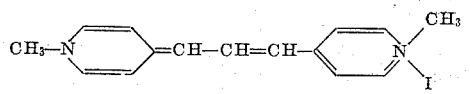

A mixture of 4.70 g. (2 mol.) of γ-picoline methiodide and 1.62 g. (1 mol.) of diethoxymethyl acetate in 10 cc. of piperidine, was heated at 120° C. on an oil bath for 3 hours. The solids from the chilled reaction mixture were collected on a funnel, washed with diethyl ether, and were recrystallized from ethyl alcohol (50 cc./g. of dye). The yield of dye which melted at 245° C. was 27% after three recrystallizations, and its solution in methyl alcohol gave an absorption maximum at 603 mu.

*Example 5.—1,1'-dimethyl-9-(4-pyridyl methiodide)-4,4'-pyridocarbocyanine iodide*

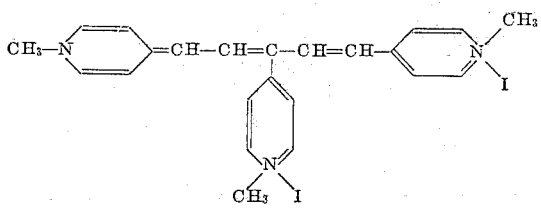

A solution of 3.05 g. (3 mol.) of γ-picoline methiodide and 2.40 g. (2 mol. + 50% excess) of diethoxymethyl acetate in 20 cc. of pyridine was refluxed gently for 30 minutes. The solid which separated from the reaction mixture was collected on a filter, washed with diethyl ether and dried. The yield of dye, after two recrystallizations from methyl alcohol (140 cc./g. of dye) was 8% and the dye melted at about 267° C. It had an absorption maximum in methyl alcohol at 645 mu.

*Example 6.—3,3', 4,4'-tetramethylthiazolocarbocyanine iodide*

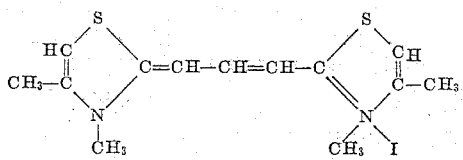

A solution of 5.1 g. (2 mol.) of 2,4-dimethylthiazole methiodide and 1.62 g. (1 mol.) of diethoxymethyl acetate in 10 cc. of piperidine was heated at 120° C. on an oil bath for 5 minutes. The mixture was then chilled, and the solids collected on a filter, washed successively with acetone, water, again with acetone, and then diethyl ether, and dried. The yield of crude dye was 33%. After two recrystallizations from ethyl alcohol (100 cc./g. of dye) a 29% yield of pure dye was obtained. The dye had a melting point of about 263° C., and its solution in methyl alcohol was crimson in color.

*Example 7. — 3,3'-dimethyl-10-[2-(4-phenyl)-oxazolyl methoperchlorate] - oxazolodicarbocyanine perchlorate*

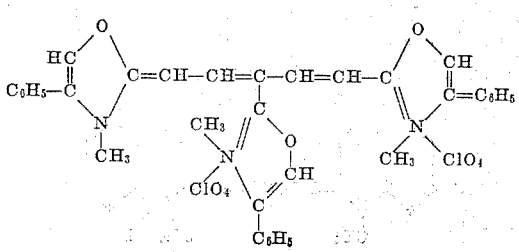

A mixture of 4.8 g. (3 mol.) of 2-methyl-4-phenyloxazole and 5.8 g. (3 mol. + 4% excess) of methyl-p-toluenesulfonate was heated at 120° C. on an oil bath for 3 hours. At the end of this time 4.9 g. (2 mol. + 50% excess) of diethoxymethyl acetate and 20 cc. of acetic anhydride were added, and the solution was refluxed gently for 15 minutes. After cooling, 4 volumes of diethyl ether were added, whereupon a viscous, brown oil precipitated from the reaction mixture. The ether layer was decanted off and the remaining oil dissolved in 50 cc. of ethyl alcohol. The dye was then converted to the perchlorate by pouring the alcoholic solution into a solution of 2 g. of sodium perchlorate in 50 cc. of water. The supernatant, aqueous layer was removed from the viscous orange semi-solid which had separated out from the solution. The semi-solid was then dissolved in 50 cc. of ethyl alcohol, and upon cooling the solution, a red crystalline solid precipitated. This was collected on a filter, washed with diethyl ether and dried. After recrystallization from methyl alcohol (1000 cc./g. of dye), a solid melting at 259° C. was obtained. Its solution in methyl alcohol had absorption maxima at 443 mu and 505 mu.

*Example 8.—3,3'-dimethyl-10-(2-benzoxazolyl methiodide)-oxadicarbocyanine iodide*

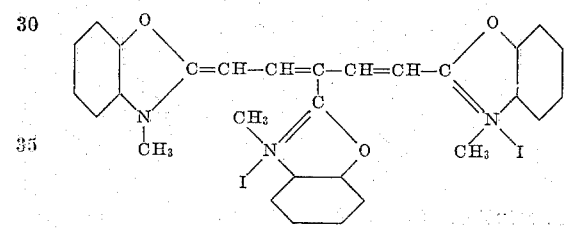

A mixture of 8.0 g. (3 mol.) of 2-methylbenzoxazole and 11.2 g. (3 mol.) of methyl-p-toluene sulfonate was heated at 120° C. on an oil bath for one hour. A solution of 10.0 g. (2 mol.+50% excess) of diethoxymethyl acetate in 25 cc. of dry 1,4-dioxane were added, and the reaction mixture was refluxed gently for one hour. After cooling, enough diethyl ether was added to completely precipitate the dye. The ether layer was decanted, the sticky residue stirred with hot acetone and the solution chilled. The red solid which precipitated was collected on a filter and then stirred with 200 cc. of hot water. The hot suspension was then filtered, and an excess of sodium iodide was added. On cooling the solution, the dye represented by the above formula was obtained. The yield of dye after two recrystallizations from methyl alcohol (250 cc./g. of dye) was 13%. It melted at about 265° C., and its solution in methyl alcohol had absorption maxima at 555 mu and 595 mu.

*Example 9.—3,3'-diethyloxacarbocyanine iodide*

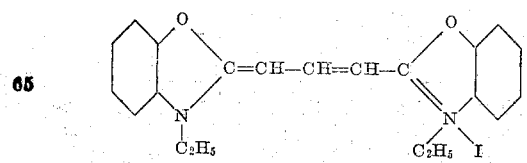

A mixture of 8.66 g. (2 mol.) of 2-methylbenzoxazole ethiodide and 4.86 g. (1 mol.+100%) of diethoxymethyl acetate was placed in a 50 cc. flask fitted with a 19 mm. x 15 cm. tube through which a thermometer could be inserted. Heating of the flask and contents was regulated by means of a heating mantle. The temperature was raised fairly rapidly to 85° C., at which point the reaction mixture began to boil, and the heat input was adjusted at such a point that a low boiling liquid, which was being evolved, could escape through the top of the tube. This liquid was identified as ethyl iodide. The temperature rose slowly over a period of 25 minutes to 105° C., at which point most of the evolution of vapor had ceased. The reaction mixture was cooled, stirred with 100 cc. of hot water, filtered hot, and the crude dye, washed on the funnel with acetone, diethyl ether, and dried. The yield of the crude dye was 75% crude and 68% after recrystallization from methyl alcohol (50 cc./g. of dye). The dye melted, at about 287° C., and the mixed melting point showed no depression with an authentic sample of the dye.

When crude 2-methylbenzoxazole etho-p-toluene sulfonate was used in place of 2-methylbenzoxazole ethiodide the reaction mixture contained a small amount of the neocyanine in addition to a fair yield of carbocyanine. No catalysts or solvents were use in either of these examples.

*Example 10.—3,3' - dimethyl - 10 - (2 - benzothiazolyl methobromide) thiadicarbocyanine bromide*

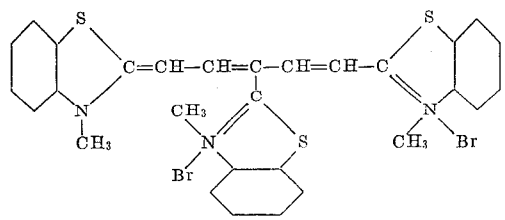

A solution of 5 g. (3 mol.) of 2-methylbenzothiazole metho-p-toluenesulfonate and 4 g. (2 mol.+150% excess) of diethoxymethyl acetate in 25 cc. of acetic acid was refluxed gently for 1½ hours. When diethyl ether was added to the chilled solution, an oily mass separated from the reaction mixture. The ether layer was decanted, and the oily product stirred well with an aqueous solution of potassium bromide. The supernatant aqueous layer was removed, and the sticky semi-solid stirred with acetone until solid. The product was then extracted with successive portions of hot methyl alcohol until the extracts no longer showed the reddish color of solutions of 3,3'-diethyl-thiacarbocyanine bromide. The yield of dye after four recrystallizations from methyl alcohol was 10%. It had a melting point of about 264° C., and its solution in methyl alcohol had an adsorption maximum at 620 mu.

*Example 11.—2,2'-dimethyl-1,1' - isoquinocarbocyanine iodide*

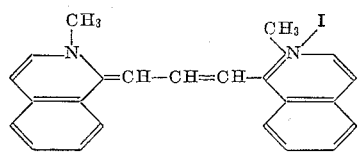

A solution of 5.70 g. (2 mol.) of 1-methylisoquinoline methiodide, 3.22 g. (1 mol.+100% excess) of diethoxymethyl acetate and 1.1 g. (1 mol.) triethylamine in 25 cc. of pyridine, was refluxed gently for 3 hours, and then chilled. The solid dye was collected on a filter, washed with water, acetone, diethyl ether, and then dried. The yield of crude dye was 73% and 47% after two recrystallizations from pyridine (290 cc./g. of dye). The dye melted at about 264° C.

*Example 12.—3,3'-dimethyl - 10 - (2 - benzoselenazolyl methochloride) - selenadicarbocyanine chloride*

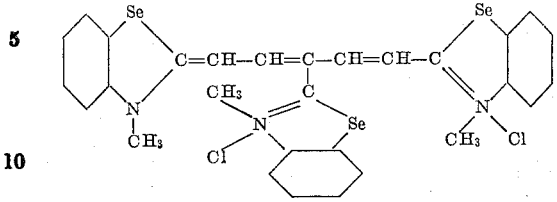

This dye was prepared in exactly the manner described in Example 10 for the preparation of 3,3-dimethyl - 10 - (2 - benzothiazolyl methobromide) thiadicarbocyanine bromide. The crude dye obtained was recrystallized from methyl alcohol (1000 cc./g. of dye), the yield amounting to about 3%. It melted at 246° C., and its blue alcohol solution faded rapidly on exposure to light.

*Example 13.—1,1'-diethyl - 6,6' - dihydroxy-4,4'-carbocyanine bromide*

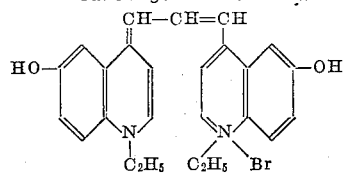

5.3 g. of 6-hydroxylepidine ethobromide, 20 cc. of pyridine and 3.2 g. of diethoxymethyl acetate were mixed in a 200 cc. flask and refluxed for 2 hours. The reaction mixture was chilled to 0° C. and the separated dye filtered off, washed with acetone, and then with hot water and dried. A yield of 0.4 g. of crude dye was obtained, which was purified by precipitating twice from alcoholic sodium hydroxide with glacial acetic acid. The dye was obtained as a very fine green powder of M. P. 267°-268° C. with decomposition.

*Example 14.—3,3'-dimethyl-10-(2 - β - naphthothiazolyl metho-p-toluenesulfonate)-4,5,4',5'-dibenzothiacarbocyanine p-toluenesulfonate*

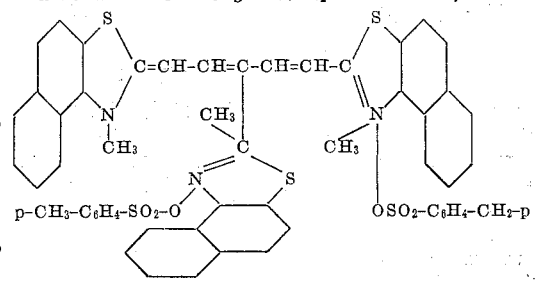

A suspension of 7.7 g. (3 mol.) of 2-methyl-β-naphthothiazole metho-p-toluene sulfonate and 3.2 g. (2 mol. + 50% excess) of diethoxymethyl acetate in 50 cc. of 1,4-dioxane, was refluxed gently for 1½ hours, and then cooled. The dye was collected on a funnel, washed with diethyl ether and dried. The yield of crude dye was 60% and 49% after two recrystallizations from ethyl alcohol (230 cc./g. of dye). The dye melted at about 239° C. and its solution in methyl alcohol had an absorption maximum at 635 mu.

*Example 15.—7,7'-dihydroxy-1,1'-dimethyl-2,2'-carbocyanine iodide*

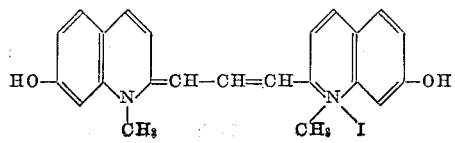

2.5 g. of 7-hydroxyquinaldine methobromide, 15 cc. of pyridine, and 1.7 g. of diethoxymethyl acetate were mixed in a 200 cc. flask and refluxed 1 hour. The reaction mixture was cooled and the dye precipitated with diethyl ether, and the ether decanted off. The dye was suspended in a small amount of methyl alcohol and 15 cc. of glacial acetic acid containing 1.5 g. of sodium iodide. The reaction mixture was chilled and the separated solid filtered off, washed with water and dried. A yield of 0.75 g. was obtained which was purified by precipitating from alcoholic sodium hydroxide with glacial acetic acid. The dye was obtained as very dark green crystals of M. P. 323-324° C. with decomposition.

*Example 16.—1,1'-diethyl-11-(2-quinolyl ethiodide)-2,2'-dicarbocyanine iodide*

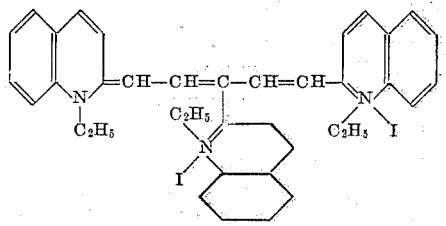

A solution of 10.3 g. (3 mol.) of quinaldine etho-p-toluene sulfonate and 6.5 g. (2 mol. + 100% excess) of diethoxymethyl acetate in 25 cc. of acetic anhydride, was refluxed gently for 30 minutes, chilled, and 2 volumes of diethyl ether were added to the blue-green reaction mixture to precipitate the dye as a sticky solid. The ether layer was decanted and the solid then was stirred with hot acetone, chilled and the dye collected on a filter. The solid was then dissolved in 50 cc. of methyl alcohol, an excess of aqueous ammonium chloride was added, whereupon crystals of pinacyanol separated from the chilled mixture, and were collected on a funnel. The filtrates and washings were concentrated under reduced pressure, and alcoholic sodium iodide was added. Green crystals with a gold reflex separated from the chilled mixture, and were collected on a funnel. The yield of crude dye was 10% and 6% after recrystallization from methyl alcohol (200 cc./g. of dye). The dye melted at about 205° C. and its solution in methyl alcohol had an absorption maximum at 656 mu.

*Example 17.—1,1'-diethyl-7,7'-dihydroxy-2,2'-carbocyanine iodide*

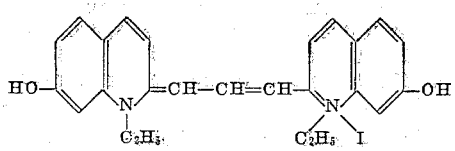

2.7 g. of 7-hydroxyquinaldine ethobromide, 10 cc. of pyridine and 1.7 g. of diethoxymethyl acetate were mixed in a 200 cc. flask and refluxed for 1 hour. The reaction mixture was cooled, and the dye was precipitated with diethyl ether. The ether was decanted off and the dye dissolved in a small amount of methyl alcohol. It was treated with 10 cc. of glacial acetic acid and 1.5 g. of sodium iodide. The reaction mixture was chilled to 0° C. and the separated solid filtered off, washed with acetone and water, and dried. A yield of 1 g. of crude dye was obtained, which was purified by precipitating twice from alcoholic sodium hydroxide. The dye was obtained as a very fine blue-green powder which had a M. P. of 315-316° C. with decomposition.

*Example 18.—1,1'-dimethyl-11-(4-quinolyl methobromide)-4,4'-dicarbocyanine bromide*

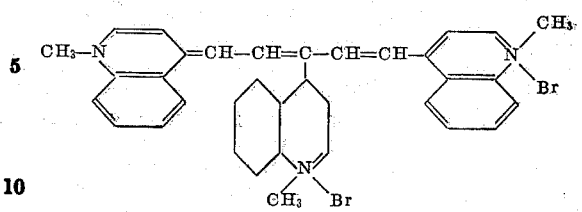

A mixture of 4.3 g. (3 mol.) of lepidine and 5.6 g. (3 mol.) of methyl-p-toluenesulfonate was heated at 120° C. for 2½ hours by means of an oil bath. 6.5 g. (2 mol.+100% excess) of diethoxymethyl acetate and 30 cc. of acetic anhydride were added, and the mixture refluxed gently for 15 minutes with occasional shaking of the flask to prevent bumping. The mixture was chilled, the solid collected on a filter, washed with acetone, water and acetone, and then converted to the bromide by dissolving in 100 cc. of hot methyl alcohol and adding an aqueous solution of 3.6 g. of potassium bromide. The yield of crude dye was 22% and 18% after recrystallization from methyl alcohol (200 cc./g. of dye). The dye melted at about 296° C., and its solution in methyl alcohol had an absorption maximum at 772 mu.

*Example 19.—6,6'-dihydroxy-3,3'-dimethyl-4,5,4',5'-dibenzothiacarbocyanine bromide*

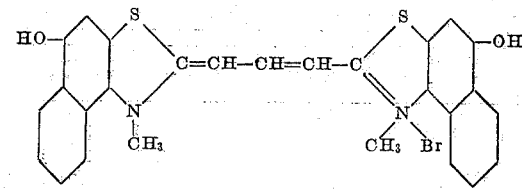

3.6 g. of 5-hydroxy-2-methyl naphtho[1,2]-thiazole methobromide, 30 cc. of pyridine and 1.6 g. of diethoxymethyl acetate were mixed in a 200 cc. flask and refluxed 30 minutes. The reaction mixture was chilled to 0° C. and the separated solid filtered off, washed with acetone and then with hot water and dried. A yield of 0.35 g. of crude dye was obtained, which was purified by twice precipitating from alcoholic sodium hydroxide with glacial acetic acid. The dye was obtained as very fine dark crystals of M. P. greater than 300° C.

*Example 20.—3,3'-diethyl-6,6'-dihydroxy-4,5,-4'-5'-dibenzothiacarbocyanine bromide*

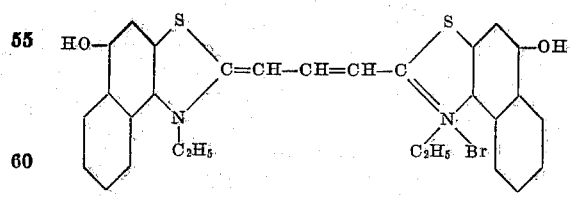

3.85 g. of 5-hydroxy-2-methyl naphtho[1,2]-thiazole ethobromide, 25 cc. of pyridine and 1.6 g. of diethoxymethyl acetate were mixed together in a 200 cc. flask and refluxed 1 hour. The reaction mixture was chilled to 0° C. and the solid filtered off, washed with acetone, and then with water, and dried. A yield of 0.9 g. of crude dye was obtained, which was purified by twice precipitating from alcoholic sodium hydroxide with glacial acetic acid. The dye was obtained as very fine dark crystals melting with slow decomposition from 285° C.

Operating in a manner similar to that employed in the above examples, other polymethine dyes (both carbocyanine and neocyanine dyes) can be prepared according to the process of our invention, in the presence or absence of a solvent (reaction media). A summary of the results accompanying the use of some of the solvents of our invention when employed as a reaction medium for the condensation of certain cyclammonium quaternary salts with one of the dialkoxymethyl carboxylates (diethoxymethyl acetate), which can be used in our invention, is given in the table below. The results given in the table are merely representative and should not be construed as limiting our invention.

ring. Stirring is continued until the dye is uniformly distributed throughout the emulsion. With most of our dyes, 10 to 20 mgs. of dye per liter of emulsion suffices to produce the maximum sensitizing effect with the ordinary gelatino-silver-bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting our inven-

|   | Cyclammonium quaternary salt | Solvent | Polymethine dye formed |
|---|---|---|---|
| 1 | 2-methylbenzothiazole metho-p-toluenesulfonate | cresols | mixture of carbo- and neocyanine. |
| 2 | ----do---- | nitrobenzene | Do. |
| 3 | ----do---- | nitromethane | Do. |
| 4 | ----do---- | 1,4-dioxane | Do. |
| 5 | ----do---- | acetic acid | Do. |
| 6 | ----do---- | formamide | carbocyanine only. |
| 7 | ----do---- | acetic anhydride | Do. |
| 8 | ----do---- | pyridine | mostly carbocyanine. |
| 9 | ----do---- | none | mostly neocyanine. |
| 10 | α-picoline ethiodide | nitrobenzene | Do. |
| 11 | ----do---- | pyridine | Do. |
| 12 | ----do---- | piperidine | carbocyanine only. |
| 13 | ----do---- | acetic anhydride | Do. |
| 14 | γ-picoline methiodide | pyridine | neocyanine only. |
| 15 | ----do---- | piperidine | carbocyanine only. |
| 16 | 2,4-dimethylthiazole methiodide | ----do---- | Do. |
| 17 | 1-methylisoquinoline methiodide | ----do---- | Do. |
| 18 | quinaldine etho-p-toluenesulfonate | nitrobenzene | Do. |
| 19 | ----do---- | nitromethane | Do. |
| 20 | quinaldine etho-p-toluenesulfonate | pyridine | Do. |
| 21 | ----do---- | 1,4-dioxane | Do. |
| 22 | ----do---- | cresols | mostly neocyanine. |
| 23 | ----do---- | acetic anhydride | Do. |
| 24 | ----do---- | none | carbocyanine only. |
| 25 | lepidine ethiodide | ----do---- | Do. |
| 26 | 2-methyl-β-naphtho-thiazole etho-p-toluenesulfonate | ----do---- | mostly neocyanine. |

Many of the dyes obtained according to the process of our invention sensitize photographic silver halide emulsions when incorporated therein.

In the preparation of photographic emulsions containing our dyes, it is only necessary to disperse the dyes in the emulsions. The methods of incorporating dyes in emulsions are simple and well known to those skilled in the art. It is convenient to add the dyes from solutions in appropriate solvents. Methanol has proved satisfactory as a solvent for some of our dyes. A mixture of pyridine and acetone can be used where the solubility of the dyes in methanol is lower than desired.

Sensitization by means of our dyes is, of course, directed primarily to the ordinarily employed gelatino-silver-halide developing-out emulsions. The dyes are advantageously incorporated in the washed, finished emulsions and should, of course, be uniformly distributed throughout the emulsions.

The concentration of our dyes in the emulsion can vary widely, i. e., from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirtion in any sense, as it will be apparent that our dyes can be incorporated by other methods in many of the photographic silver halide emulsions customarily employed in the art. For instance, the dyes may be incorporated by bathing a plate or film upon which an emulsion has been coated, in the solution of the dye, in an appropriate solvent. Bathing methods, however, are not to be preferred ordinarily.

The solubility of the dyes, prepared from the cyclammonium quaternary salts represented by Formula I above wherein R represents a β-hydroxyethyl or γ-hydroxypropyl group, can be improved by treatment of such dyes with sulfuric acid. It has been found that this method for improving solubility is applicable not only to the dyes of this invention, but also to merocyanine, styryl, hemicyanine, oxonol, etc., dyes which contain a hydroxyalkyl group, the hydroxyl group of which can be esterified. The following examples illustrate this method of improving solubility.

*Example 21.*—Anhydro-1'-ethyl-3-β-sulfatoethyl-thia-2'-cyanine hydroxide

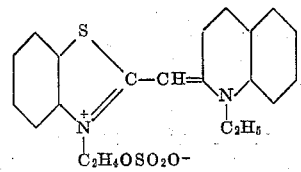

2.0 g. (1 mol.) of 1'-ethyl-3-β-hydroxyethyl-thia-2'cyanine bromide and 20 cc. of concentrated sulfuric acid were mixed together at room temperature. The dye dissolved at once with the evolution of fumes of hydrobromic acid. The mixture was allowed to stand for two hours, diluted with 400 cc. of an ice and water mixture, and the precipitated orange dye collected on a filter. The dye was washed on the filter with 25 cc. of water and dried. The yield of the slightly sticky orange solid was 0.9 g. (49%). After recrystallization from glacial acetic acid (50 cc./g. of dye), the dye was obtained as orange crystals melting above 310° C.

The 1'-ethyl-3-β-hydroxyethylthia-2'-cyanine bromide used above was prepared as follows:

9.1 g. (1 mol.) of 2-methylbenzothiazole-β-hydroxyethobromide, 14.6 g. (1 mol.) of 2-phenylmercaptoquinoline etho-p-toluenesulfonate, 3.4 g. (1 mol.) of triethylamine and 75 cc. of absolute ethyl alcohol were boiled under reflux for 15 minutes. Red crystals of dye separated almost at once from the boiling mixture. The solution was chilled to 0° C., filtered, and the dye washed on the filter with 15 cc. of water. The yield of red crystals was 11.5 g. (80%). After recrystallization from methyl alcohol (50 cc./g. of dye), the dye was obtained as red crystals melting with decomposition at 277–279° C.

In a manner similar to that described above, the solubility of other dyes containing a hydroxyalkyl group can be improved by treatment with sulfuric acid.

Some of the carbocyanine dyes of our invention can be dequaternized to give the corresponding carbocyanine bases, some of which are useful in sensitizing photographic silver-halide emulsions. It has been found that carbocyanine dyes, wherein the group substituted on one of the auxochromic nitrogen atoms is an alkyl group, while the group substituted on the other auxochromic nitrogen atom is a benzyl group, can be selectively dequaternized so that the benzyl group is removed in preference to the alkyl group. This process has been found to be especially useful in the dequaternization of cyanine dyes which contain different heterocyclic nuclei or different groups attached to the auxochromic nitrogen atoms, since only a single dye base is formed. The removal of the benzyl group in preference to another alkyl group thus provides a ready means for dequaternizing unsymmetrical dyes to give only one dye base, where a mixture was previously obtained. The following example shows how one of our dyes can be dequaternized.

*Example 22.—2-[3-(3-β-hydroxyethyl-2(3)-benzothiazolylidene)-propenyl]benzothiazole*

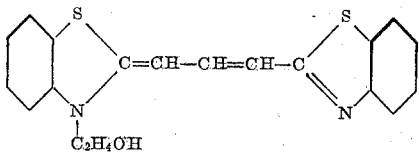

1.0 g. (1 mol.) of 3-benzyl-3'-β-hydroxyethylthiacarbocyanine bromide and 200 cc. of N,N-diethylaniline were boiled together in an all-glass apparatus under an atmosphere of carbon dioxide. Half of the N,N-diethylaniline was distilled off slowly over a period of 20 minutes, during which time the color of the solution changed from purple to orange. The solution was filtered while hot, and the filtrate concentrated under reduced pressure to a volume of 5 cc. The product was precipitated by the addition of 100 cc. of ligroin, chilled to 0° C. and collected on a filter. The yield of brown crystals was 0.35 g. (52%). After recrystallization from 20 cc. of acetone, the product melted at 217°–220° C.

The 3-benzyl-3'-β-hydroxyethylthiacarbocyanine bromide used above was prepared as follows:

11.4 g. (1 mol.) of 2-[(2-acetanilido)vinyl]-benzothiazole benzobromide, 6.7 g. (1 mol.) of 2-methylbenzothiazole β-hydroxyethobromide, 2.5 g. (1 mol.) of triethylamine and 100 cc. of absolute ethyl alcohol were boiled together under reflux for 10 minutes. The mixture was chilled to 0° C., diluted with 50 cc. of acetone and the dye collected on a filter. The dye was then washed with 25 cc. of acetone, followed by 25 cc. of water, and dried. The crude yield of blue crystals was 5.1 g. (40%). After recrystallization from 300 cc. of methyl alcohol, the dye was obtained as green crystals which melted with decomposition at 239°–242° C.

In like manner to that described above, other cyanine dyes (both symmetrical and unsymmetrical) can be dequaternized to give cyanine bases.

The cyclammonium quaternary salts containing a reactive methyl group in the α- or γ-position, which we employ in practicing our invention, are for the most part known. They can be prepared by heating the corresponding heterocyclic nitrogen base with an alkyl salt, e. g. methyl iodide, ethyl iodide, n-propyl bromide, n-butyl chloride, methyl p-toluenesulfonate, ethyl p-toluenesulfonate, ethyl benzene sulfonate, diethyl sulfate, dimethyl sulfate, etc. using a closed tube for heating where higher temperatures are desired or volatility of the reactants demands. The quaternary iodides and bromides can be converted to the more soluble quaternary chlorides, e. g. by reacting the quaternary bromide or iodide with silver chloride, in boiling methyl alcohol, or in a phenol as described in United States Patent 2,245,249, dated June 10, 1941. Similarly the quaternary bromides can be converted to quaternary acetates by heating with silver acetate in methyl alcohol. Quaternary perchlorates can be formed by treating an ethyl alcoholic solution of the quaternary bromide or iodide with a hot aqueous solution of sodium perchlorate. The aryl quaternary salts cannot be prepared in a manner analogous to that used for the alkyl quaternary salts. 2-methylbenzothiazole phenohalides are described in United States Patent 2,317,357, dated April 27, 1943, and 2,330,203, dated September 28, 1943. 2-methyl-3-phenylthiazolinium bromide can be prepared by heating thioacetanilide and ethylene dibromide together at 115 to 120° C. (See United States Patent 2,441,558, dated May 18, 1948.)

The heterocyclic bases themselves, from which the alkyl quaternary salts can be prepared, are known for the most part. Several of the 2-methylbenzothiazole bases can be prepared by the method of Fries et al., Ann. 407, 208 (1915) in which the appropriate thioacetyl-aniline is oxidized with alkaline potassium ferricyanide. Thus p-chlorothioacetanilide gives 6-chloro-2-methylbenzothiazole. The thioacetylanilines can be prepared by treating the corresponding acetylaniline with phosphorus pentasulfide in dry benzene or xylenes. The acetylanilines can be prepared by the action of acetic anhydride or acetyl chloride on the corresponding aniline compound. Several of the 2-methylbenzothiazole bases can be also be prepared by reducing bis(o-nitrophenyl)-disulfides with zinc dust and acetic acid, acetylating the reducton mixture with acetic anhydride and closing the ring by heating the resulting mixture. The bis(o-nitrophenyl)disulfides can be prepared from the corresponding o-bromonitrobenzenes by heating the o-bromonitrobenzene with sodium disulfide in methyl alcohol. Thus 2 - bromo - 4 - chloronitrobenzene gives bis(5-chloro-2-nitrophenyl) disulfide which, on reduction, acetylation of the reduction product and heating gives 2-methyl-6-chlorobenzothiazole. 2-methyl-5-phenylbenzothiazole can be prepared by reducing bis(3-nitro-4-biphenyl)-disulfide with zinc and acetic acid and acetylating the reduction product. (See the copending application of Gertrude Van Zandt and L. G. S. Brooker, Serial No. 711,816, filed November 22, 1946, now U. S. Patent 2,515,913, dated July 18, 1950.) 2-methyl-4-phenylbenzothiazole can be prepared by oxidizing o-thioacetamidobiphenyl with an alkali metal ferricyanide. (See the copending application of Gertrude Van Zandt and L. G. S. Brooker, Serial No. 709,414, filed November 13, 1946, now U. S. Patent 2,485,679, dated October 25, 1949.) 2-methylbenzoxazoles can be prepared by treating the appropriate o-aminophenol with an excess of acetic anhydride, distilling off the acetic acid generated in the reaction as it is formed. Thus o-aminophenol and acetic anhydride give 2-methylbenzoxazole. 2-methylbenzoselenazole bases can be prepared by reducing bis(o-nitrophenyl)diselenides with zinc dust and acetic acid, acetylating the reaction mixture with acetyl anhydride, and closing the ring by heating the resulting mixture. The bis(o-nitrophenyl)diselenides can be prepared from the corresponding o-bromonitrobenzenes by heating the o-bromonitrobenzene with sodium diselenide in methyl alcohol. See also Clark, J. Chem. Soc. (London) 1928, 2313.

What we claim as our invention and desire to be secured by Letters Patent of the United States is:

1. A process for preparing a polymethine dye comprising condensing a cyclammonium quaternary salt containing a methyl group in a reactive position, with a dialkoxymethyl carboxylate selected from those represented by the following general formula:

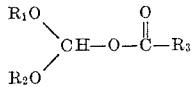

wherein $R_1$, $R_2$ and $R_3$ each represents an alkyl group of the formula $C_nH_{2n+1}$ wherein $n$ represents a positive integer of from 1 to 4.

2. A process for preparing a polymethine dye comprising condensing a cyclammonium quaternary salt selected from those represented by the following two general formulas:

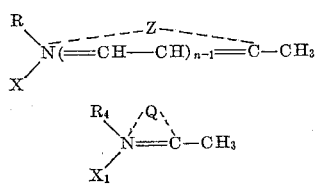

wherein R represents an alkyl group, of the formula $C_mH_{2m+1}$ wherein $m$ represents a positive integer from 1 to 5, X and $X_1$ each represents an anion, $R_4$ represents a phenyl group, Z represents the non-metallic atoms necessary to complete a heterocyclic nucleus selected from those of the thiazole series, those of the benzothiazole series, those of the naphthothiazole series, those of the oxazole series, those of the benzoxazole series, those of the naphthoxazole series, those of the selenazole series, those of the benzoselenazole series, those of the naphthoselenazole series, those of the thiazoline series, those of the 2-pyridine series, those of the 4-pyridine series, those of the 2-quinoline series, those of the 4-quinoline series, those of the 1-isoquinoline series, those of the 3-isoquinoline series and those of the 3,3-dialkyl indolenine series, $n$ represents a positive integer from 1 to 2 and Q represents the non-metallic atoms necessary to complete a heterocyclic nucleus selected from the group consisting of those of the thiazole series, those of the benzothiazole series, those of the thiazoline series and those of the 3,3-dialkylindolenine series, with a dialkoxymethyl carboxylate selected from those represented by the following general formula:

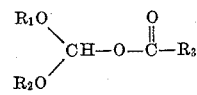

wherein $R_1$, $R_2$ and $R_3$ each represents an alkyl group of the formula $C_nH_{2n+1}$ wherein $n$ represents a positive integer from 1 to 4.

3. A process for preparing a polymethine dye comprising condensing a cyclammonium quaternary salt selected from those represented by the following general formula:

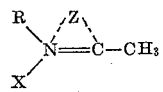

wherein R represents an alkyl group of the formula $C_mH_{2m+1}$ wherein $m$ represents a positive integer from 1 to 4, X represents an anion and Z represents the non-metallic atoms necessary to complete a heterocyclic nucleus of the benzothiazole series, with a dialkoxymethyl carboxylate selected from those represented by the following general formula:

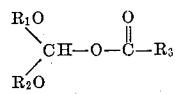

wherein $R_1$, $R_2$ and $R_3$ each represents an alkyl group of the formula $C_nH_{2n+1}$ wherein $n$ is a positive integer from 1 to 4.

4. A process for preparing a polymethine dye comprising condensing a cyclammonium quaternary salt selected from those represented by the following general formula:

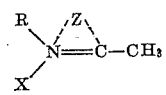

wherein R represents an alkyl group of the formula $C_mH_{2m+1}$ wherein $m$ represents a positive integer from 1 to 4, X represents an anion and Z represents the non-metallic atoms necessary to complete a heterocyclic nucleus of the benzothiazole series, with diethoxymethyl acetate.

5. A process for preparing a polymethine dye comprising condensing a cyclammonium quaternary salt represented by the following formula:

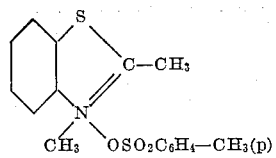

with diethoxymethyl acetate.

6. A process for preparing a polymethine dye comprising condensing a cyclammonium quaternary salt selected from those represented by the following general formula:

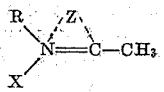

wherein R represents an alkyl group of the formula $C_mH_{2m+1}$ wherein $m$ represents a positive integer from 1 to 4, X represents an anion and Z represents the non-metallic atoms necessary to complete a heterocyclic nucleus of the benzoxazole series, with a dialkoxymethyl carboxylate selected from those represented by the following general formula:

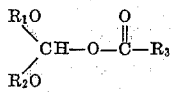

wherein $R_1$, $R_2$ and $R_3$ each represents an alkyl group of the formula $C_nH_{2n+1}$ wherein $n$ is a positive integer from 1 to 4.

7. A process for preparing a polymethine dye comprising condensing a cyclammonium quaternary salt selected from those represented by the following general formula:

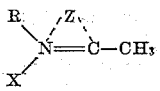

wherein R represents an alkyl group of the formula $C_mH_{2m+1}$ wherein $m$ represents a positive integer from 1 to 4, X represents an anion and Z represents the non-metallic atoms necessary to complete a heterocyclic nucleus of the benzoxazole series with diethoxymethyl acetate.

8. A process for preparing a polymethine dye comprising condensing a cyclammonium quaternary salt represented by the following formula:

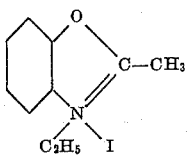

with diethoxymethyl acetate.

9. A process for preparing a polymethine dye comprising condensing a cyclammonium quaternary salt selected from those represented by the following general formula:

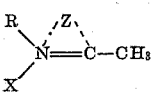

wherein R represents an alkyl group of the formula $C_mH_{2m+1}$ wherein $m$ represents a positive integer from 1 to 4, X represents an anion and Z represents the non-metallic atoms necessary to complete a heterocyclic nucleus of the β-naphthothiazole series, with a dialkoxymethyl carboxylate selected from those represented by the following general formula:

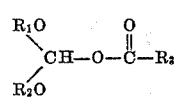

wherein $R_1$, $R_2$ and $R_3$ each represents an alkyl group of the formula $C_nH_{2n+1}$ wherein $n$ is a positive integer from 1 to 4.

10. A process for preparing a polymethine dye comprising condensing a cyclammonium quaternary salt selected from those represented by the following general formula:

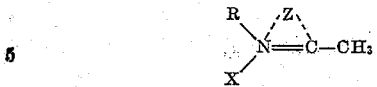

wherein R represents an alkyl group of the formula $C_mH_{2m+1}$ wherein $m$ represents a positive integer from 1 to 4, X represents an anion and Z represents the non-metallic atoms necessary to complete a heterocyclic nucleus of the β-naphthothiazole series, with diethoxymethyl acetate.

11. A process for preparing a polymethine dye comprising condensing a cyclammonium quaternary salt represented by the following formula:

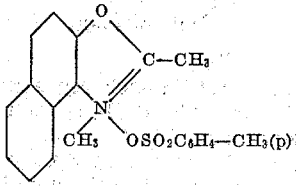

with diethoxymethyl acetate.

12. A process for preparing a polymethine dye comprising condensing a cyclammonium quaternary salt selected from those represented by the following general formula:

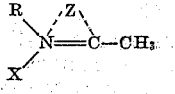

wherein R represents an alkyl group of the formula $C_mH_{2m+1}$ wherein $m$ represents a positive integer from 1 to 4, X represents an anion and Z represents the non-metallic atoms necessary to complete a heterocyclic nucleus of the 2-quinoline series, with a dialkoxymethyl carboxylate selected from those represented by the following general formula:

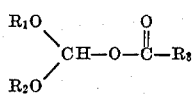

wherein $R_1$, $R_2$ and $R_3$ each represents an alkyl group of the formula $C_nH_{2n+1}$ wherein $n$ is a positive integer from 1 to 4.

13. A process for preparing a polymethine dye, comprising condensing a cyclammonium quaternary salt selected from those represented by the following general formula:

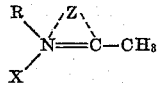

wherein R represents an alkyl group of the formula $C_mH_{2m+1}$ wherein $m$ represents a positive integer from 1 to 4, X represents an anion and Z represents the non-metallic atoms necessary to complete a heterocyclic nucleus of the 2-quinoline series, with diethoxymethyl acetate.

14. A process for preparing a polymethine dye comprising condensing a cyclammonium quaternary salt represented by the following formula:

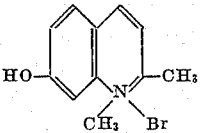

with diethoxymethyl acetate.

15. A process for preparing a polymethine dye comprising condensing a cyclammonium quaternary salt selected from those represented by the following general formula:

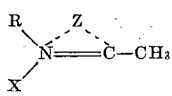

wherein R represents an alkyl group of the formula $C_mH_{2m+1}$ wherein $m$ represents a positive integer from 1 to 4, X represents an anion and Z represents the non-metallic atoms necessary to complete a heterocyclic nucleus of the thiazole series, with a dialkoxymethyl carboxylate selected from those represented by the following general formula:

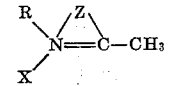

wherein $R_1$, $R_2$ and $R_3$ each represents an alkyl group of the formula $C_nH_{2n+1}$ wherein $n$ is a positive integer from 1 to 4.

16. A process for preparing a polymethine dye comprising condensing a cyclammonium quaternary salt selected from those represented by the following general formula:

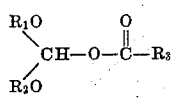

wherein R represents an alkyl group of the formula $C_mH_{2m+1}$ wherein $m$ represents a positive integer from 1 to 4, X represents an anion and Z represents the non-metallic atoms necessary to complete a heterocyclic nucleus of the thiazole series, with diethoxymethyl acetate.

17. A process for preparing a polymethine dye comprising condensing a cyclammonium quaternary salt represented by the following formula:

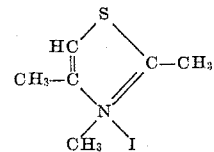

with diethoxymethyl acetate.

SAMUEL G. DENT, Jr.
LESLIE G. S. BROOKER.

REFERENCES CITED

The following references are of record in the file of this patent:

UNITED STATES PATENTS

| Number | Name | Date |
|---|---|---|
| 1,910,478 | Schmidt | May 23, 1933 |
| 1,910,479 | Schmidt | May 23, 1933 |
| 2,191,810 | Stevens | Feb. 27, 1940 |

OTHER REFERENCES

Ogata: Proc. Imperial Acad., Tokyo, No. 10 (1932), pp. 503–505.

Kimura: Imperial Acad. of Japan, 1937–1938, No. 7, pp. 261–265.

Post: J. Organic Chemistry, 1938, pp. 260–266.

Neblette: "Photography," p. 275, 4th ed., D. Van Nostrand Co.

Certificate of Correction

Patent No. 2,537,880            January 9, 1951

SAMUEL G. DENT, Jr., ET AL.

It is hereby certified that error appears in the printed specification of the above numbered patent requiring correction as follows:

Column 5, line 69, Example 7, right-hand portion, for "$C=C_6H_5$" read $C-C_6H_5$; column 8, line 54, Example 14, right-hand portion, for "$OSO_2-C_6H_4-CH_2-p$" read $OSO_2-C_6H_4-CH_3-p$ column 18, lines 16 to 20 for that portion of the formula reading

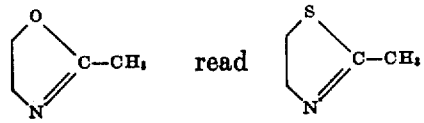

column 19, lines 26 to 28, for that portion of the formula reading

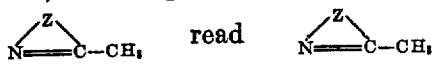

and that the said Letters Patent should be read as corrected above, so that the same may conform to the record of the case in the Patent Office.

Signed and sealed this 1st day of May, A. D. 1951.

[SEAL]

THOMAS F. MURPHY,
*Assistant Commissioner of Patents.*